US005271293A

United States Patent [19]

Olsson et al.

[11] Patent Number: 5,271,293

[45] Date of Patent: Dec. 21, 1993

[54] CONTROL UNIT FOR A MEDICAL APPARATUS

[75] Inventors: Sven-Gunnar Olsson, Arloev; Sture Eriksson, Vallentuna; Rolf Edstroem, Kungsaengen, all of Sweden

[73] Assignee: Siemens Aktiengesellschaft, Munich, Fed. Rep. of Germany

[21] Appl. No.: 785,930

[22] Filed: Oct. 31, 1991

[30] Foreign Application Priority Data

Oct. 31, 1990 [SE] Sweden ................................ 9003467

[51] Int. Cl.[5] ........................ F16J 15/32; G05G 1/10; G05G 5/02; H01H 19/06

[52] U.S. Cl. ........................................ 74/553; 74/10.2; 74/526; 200/302.1; 200/566

[58] Field of Search ........................ 16/121, DIG. 41; 74/483 PB, 553, 10.2, 526; 200/302.1, 302.2, 566

[56] References Cited

U.S. PATENT DOCUMENTS 1,498,817 6/1924 Smith .
1,889,175 11/1932 Evans .................................. 200/566
2,444,485 7/1948 Aitcheson .
2,580,026 12/1951 Jacobi .
2,854,536 9/1958 Beer .................................. 20/302.2
2,869,395 1/1959 Allison .
3,030,478 4/1962 Paolino, Jr. ......................... 200/566
3,218,427 11/1965 Mekelburg ............................ 74/553
3,541,288 11/1970 Maas ................................ 200/302.2
3,564,929 2/1971 Halstead .............................. 74/10.2
4,137,959 2/1979 Zaydel ................................. 74/553
4,153,149 5/1979 Weber .
4,154,125 5/1979 Frank ................................... 74/553
4,201,096 5/1980 Morrison et al. ...................... 74/553
4,230,922 10/1980 Habecker ......................... 200/302.2
4,334,132 6/1982 Poole .................................. 200/566
4,439,654 3/1984 Bresin et al. ........................ 200/566
4,779,305 10/1988 Gorsek ................................. 16/121
4,823,397 4/1989 Hewitt .................................. 74/553
4,980,960 1/1991 Usui et al. .
5,018,951 5/1991 Wang .................................. 200/566
5,093,764 3/1992 Hasegawa et al. .................... 74/553

FOREIGN PATENT DOCUMENTS 2049390 4/1972 Fed. Rep. of Germany .
1565694 5/1969 France .

OTHER PUBLICATIONS

Servo Ventilator 900 B Service Manual, Siemens--Elema.

*Primary Examiner*—Lowell A. Larson
*Assistant Examiner*—Donald M. Gurley
*Attorney, Agent, or Firm*—Hill, Steadman & Simpson

[57] ABSTRACT

A knob assembly is disclosed for a control unit of a medical apparatus with a front panel. In order to transfer a turning setting movement through the front panel, a feed-through sleeve is rotatably arranged in the front panel and a knob core is movably arranged in the feed-through sleeve. On the control side of the front panel the feed-through sleeve and the knob core are enclosed by a manipulable element which, through application of pressure, can axially move the knob core in the feed-through sleeve. The knob core on the back side of the front panel moves a resilient locking washer from a locking position to an unlocked position so that turning of the manipulable element also will turn the feed-through sleeve. To improve the sealing at the feed-through location, the front panel is provided with a protection plate which is beaded outwards and surrounding the feed-through sleeve, with the manipulable element tightly enclosing the beaded protection.

17 Claims, 1 Drawing Sheet

CONTROL UNIT FOR A MEDICAL APPARATUS

BACKGROUND OF THE INVENTION

1. Field of the Invention

The invention relates to a control unit for a medical apparatus of the type having a front panel in which at least one setting knob and/or a switching knob is located.

2. Description of the Prior Art

A control unit is known through a service manual 10 for Servo Ventilator 900B, Siemens-Elema AB, Publication No. S1080 Oct. 5, 1980 and having a front panel with setting knob assemblies that control potentiometers for setting of a number of different ventilator functions. A knob assembly includes a turning knob on the front of the front panel, which turning knob is screwed onto a feed-through shaft, which passes through a hole in the front panel to the potentiometer. The feed-through shaft is fastened axially in the front panel with a nut on the back side of the front panel and a locking nut on the front. To protect the control unit from the penetration of liquid, the front panel is covered with a thin protection plate of plastic. At the hole through the front panel, the locking nut prevents liquid from penetrating by its pressure against the front panel.

The setting knobs of the control unit cannot, however, be fixed so as to remain precisely at the set positions, which means that a setting can be changed by mistake. There is also a risk that the potentiometer or the turning knobs may break, as the force applied to the turning knob is directly transferred to the potentiometer via the feed-through shaft.

SUMMARY OF THE INVENTION

An object of the invention is to provide a control unit that is easy to set in various positions without risking an accidental change of setting, and constructed in such a way that the potentiometer does not break from too much turning force applied to the setting knob, and wherein the front panel in an easy manner effectively seals off liquid, in particular in the area of the setting/-switching knobs.

This object is achieved in a control unit constructed in accordance with the principles of the present invention having a feed-through sleeve of the setting/switching knob rotatably arranged in the front panel, a knob core arranged in a movable and resilient manner in the feed-through sleeve, with the knob core being accessible from the front of the front panel. The setting/-switching knob is locked in at least one direction of rotation by a stop when no force is applied to the knob core, and the setting/switching knob is turnable in both directions of rotation when force is applied to the knob core against the resilient arrangement.

A setting/switching knob is thus obtained which is easy to handle by releasing the catch via the knob core and turning the knob to a desired setting with the feed-through sleeve. The knob can be locked either in both directions or in only one direction, to prevent a higher value than the desired to be set, for example.

In connection with this embodiment of the invention, it is advantageous to have a manipulable element tightly enclose the feed-through sleeve and the knob core on the front of the front panel, and to provide a locking washer fastened to the knob core at the feed-through sleeve which locks the setting/switching knob against the stop.

By having the manipulable element frictionally engage the feed-through sleeve, the force that can be transferred from the manipulable element via the feed-through sleeve to the potentiometer is limited and, before the force becomes great enough to damage the potentiometer, the manipulable element will start to slide in relation to the feed-through sleeve. By constructing the manipulable element with a region of increased diameter, preferably in the shape of a collar, the manipulation of the knob will be simplified as the collar works as a riveting head for the force applied to the knob core.

By beading the front panel, or by beading a protection plate of the front panel at the feed-through sleeve, and by using a manipulable element that is elastic and encloses the beaded part, a liquid-proof front panel is obtained for the above embodiment.

With an exchangeable protection plate it is also possible to quickly and easily adapt the front panel to a different language, to different settings, etc.

The problem of sealing is solved in that a handling element of the setting/switching knob fits tightly against the front panel. Liquid is thus rejected directly at the interface between the manipulable element and the front panel.

For this purpose, it is advantageous to make the front panel beaded at the setting/switching knob, with the manipulable element being elastic and formed to tightly enclose the beaded part of the front panel. This provides for a particularly tight interface, because liquid must pass through a long labyrinthine path to reach the feed-through sleeve.

Alternatively, the front panel can be provided with a thin protection plate which is beaded at the setting/-switching knob and the manipulable element can be elastic and formed to tightly enclose the beaded part of the protection plate. This provides a more simplified design for the front panel possible.

For this embodiment of the invention, the setting/-switching knob including a feed-through sleeve, rotatably arranged in the front panel, a knob core which is arranged in a movable and resilient manner in the feed-through sleeve and a locking washer arranged at the feed-through sleeve and fastened to the knob core. The locking washer locks the setting/switching knob against a stop in at least one direction of rotation and releases the setting/switching knob when the knob core is pushed against the resilient arrangement. The manipulable element tightly encloses the feed-through sleeve and the knob core.

The problem of fixing the setting may alternatively be solved in accordance with the invention in another version wherein a resilient locking washer with at least one locking hook is fastened to a knob core of the setting/switching knob, the knob core being arranged in a movable manner in a rotatably arranged feed-through sleeve of the setting/switching knob. The locking washer prevents the rotatability in at least one direction against a stop, but the stop may be passed by applying force to the knob core against the resilient locking washer, causing the locking hook to be pressed making the setting/switching knob turnable.

A functional and safe construction is thus obtained with a minimum of elements.

DESCRIPTION OF THE PREFERRED EMBODIMENTS

Figure 1:
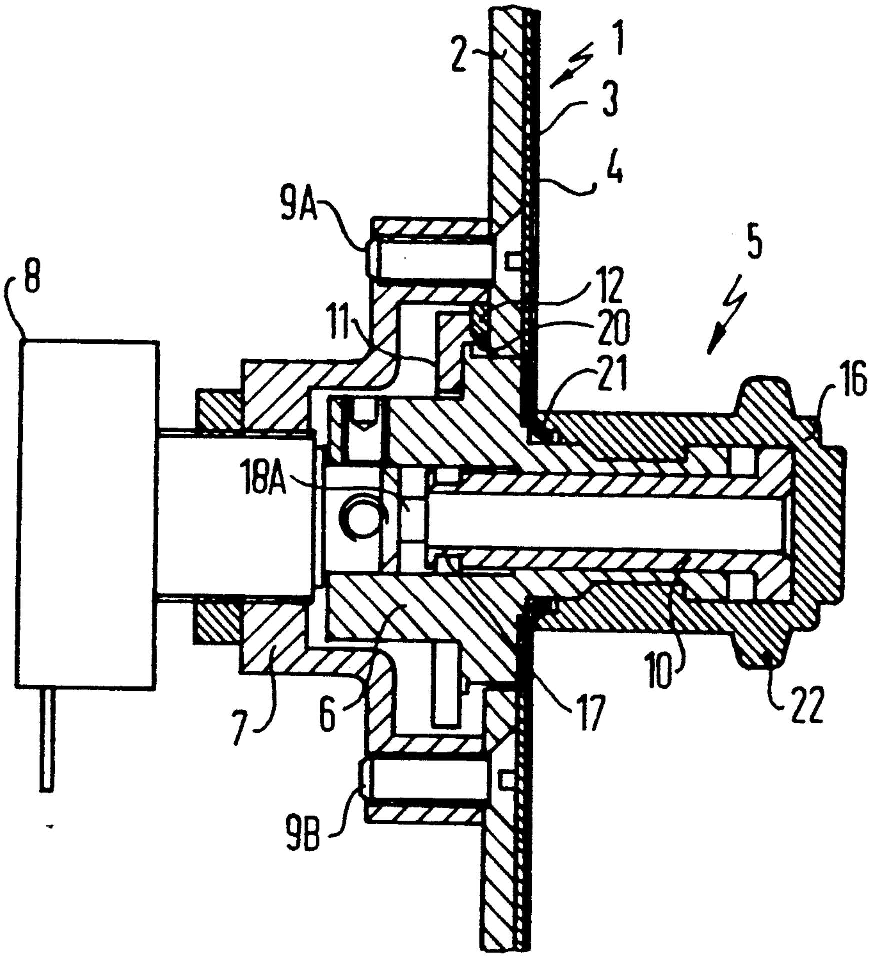
FIG. 1 is a cross-sectional view of a setting knob assembly, constructed in accordance with the principles of the present invention, disposed in a front panel of a control unit of a medical apparatus.

A part of a front panel 1 of a control unit is shown in FIG. 1 together with a setting assembly knob 5. The front panel 1 is formed by a back panel plate 2 and a front panel plate 3, whereby the front panel plate 3 is exchangeable and has a thin plastic plate 4 glued onto it.

The setting knob assembly 5 includes a feed-through sleeve 6, a knob core 10, and a resilient locking washer 11, a stop 12, a console 7 and a manipulable element 16.

A potentiometer 8 is located in the console 7, which is connected to the feed-through sleeve 6. The console 7 is fastened to the back panel plate 2 by two screws 9A and 9B thereby holding the potentiometer 8 and the setting knob assembly 5 in place on the front panel 1.

Figure 2:
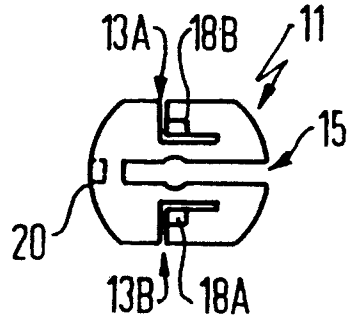
FIG. 2 is a plan view of a locking washer of the setting knob assembly of FIG. 1.
Figure 3:
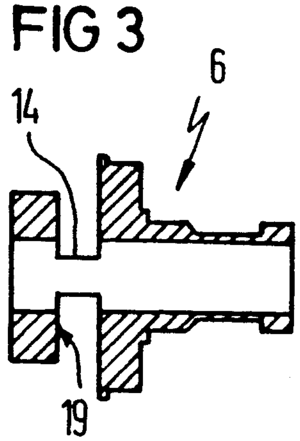
FIG. 3 is a cross-sectional view of a feed-through sleeve of the setting knob assembly of FIG. 1.

As can be seen from FIG. 3, the feed-through sleeve 6 has two recesses, which thereby form two opposite branches 14 (only one is visible). A slot 15 of the locking washer 11 (FIG. 2) fits over these branches 14.

The knob core 10 in FIG. 1 has an annular groove 17 in which the locking washer 11 is to be fixed. In order to obtain a well-defined position for the locking washer 11 relative to the knob core 10, the slot 15 of the locking washer 11 is made narrower than the diameter of the annular groove 17 of the knob core 10, except at a location which corresponds to the well-defined position for the locking washer 11. At this location, the slot 15 of the locking washer 11 is adapted to the annular groove 17.

In FIG. 2, it is shown that the locking washer 11 further has two slots 13A and 13B, which are responsible for the resiliency of the locking washer 11, which is necessary in order to make the knob assembly 5 function. Also necessary are two shoulders 18A and 18B which, when the locking washer 11 is mounted, are in contact with the surface 19 (FIG. 3) of the feed-through sleeve 6. When the knob core 10 is pressed, the locking washer 11 will be forced apart at the two slots 13A and 13B and a locking hook 20 on the underside of the locking washer 11 (indicates with a broken line in FIG. 2) may be moved past the stop 12. In FIG. 1, the stop is formed as a projection on the back side of the front panel 1. The number of stops 12 depend on the number of settings made available to the setting knob assembly 5. The locking hook 20 may be formed rectangularly to enable locking in both direction, or have a slope on one side to be able to slide over the stop 12 in one direction.

The manipulable element 16 is made of an elastic material and encloses the feed-through sleeve 6 and the knob core 10 at the front of the front panel 1. In order to improve the sealing ability of the front panel 1 at the knob assembly 5, the plastic plate 4 is beaded 21 outwardly at the feed-through sleeve 6 and the manipulable element 16 tightly encloses the beaded part. To facilitate manipulation of the setting knob assembly 5, the manipulable element 16 is also provided with a collar 22.

Although modifications and changes may be suggested by those skilled in the art, it is the intention of the inventors to embody within the patent warranted hereon all changes and modifications as reasonably and properly come within the scope of their contribution to the art.

We claim as our invention:

1. A knob assembly for an apparatus having a front panel, said knob assembly comprising:
   - a feed-through sleeve extending through and rotatably mounted in an opening in said front panel;
   - a knob core disposed inside said feed-through sleeve so as to be axially movable therein, said knob core being accessible from a front of said front panel;
   - resilient means acting on said knob core for normally urging said knob core in a first axial direction;
   - locking means attached to said knob core and engaged with said feed-through sleeve;
   - stop means interacting with said locking means for locking said feed-through sleeve in at least one direction of rotation when no axial force is applied to said knob core in a second axial direction opposite said first axial direction and for permitting rotation of said feed-through sleeve in two rotational directions when a force is applied to said knob core in said second axial direction.

2. A knob assembly as claimed in claim 1 wherein said stop means is attached to a backside of said front panel.

3. A knob assembly as claimed in claim 1 further comprising:
   - a manipulable element tightly enclosing said feed-through sleeve and said knob core at said front of said front panel.

4. A knob assembly as claimed in claim 3 wherein said manipulable element has an outer diameter, and has a projecting region having a diameter larger than said outer diameter.

5. A knob assembly as claimed in claim 4 wherein said projecting region is in the form of a collar surrounding an exterior of said manipulable element.

6. A knob assembly as claimed in claim 3 further comprising:
   - an annular projection extending from said front panel surrounding said feed-through sleeve; and
   - said manipulable element consisting of deformable material and being formed to tightly enclose said projection.

7. A knob assembly as claimed in claim 3 further comprising:
   - an annular thin protection plate covering said front panel, said protection plate having a projection extending toward said manipulable element surrounding said feed-through sleeve; and
   - said manipulable element consisting of deformable material and being formed to tightly enclose said projection of said protection plate.

8. A knob assembly as claimed in claim 1 comprising a resilient locking washer forming both said resilient means and said locking means.

9. A knob assembly in a front panel of an apparatus, said front panel having an outwardly extending annular projection extending about an opening in said front panel and said knob assembly extending through and rotatable in said opening and comprising a rotatable manipulable element rotatable with said knob assembly at a front of said front panel, said manipulable element consisting of deformable material and being formed to tightly enclose said projection on said front panel while permitting rotation of said manipulable element on said projection.

10. A knob assembly as claimed in claim 9 further comprising:

a feed-through sleeve extending through and rotatably mounted in an opening in said front panel;

a knob core disposed inside said feed-through sleeve and being axially movable therein;

resilient means acting on said knob core for normally urging said knob core in a first axial direction; and a locking washer means fastened to said knob core for locking said feed-through sleeve against a stop in at least one direction of rotation and for releasing said feed-through sleeve from engagement with said stop when said knob core is pressed against said resilient means in a second axial direction opposite said first axial direction;

said manipulable element surrounding said feed-through sleeve and said knob core and being co-movable therewith.

11. A knob assembly as claimed in claim 10 wherein said locking washer simultaneously forms said resilient means.

12. A knob assembly for an apparatus having a front panel, said knob assembly comprising:

a feed-through sleeve extending through and rotatably mounted in an opening in said front panel;

a knob core disposed inside said feed-through sleeve and being axially movable therein;

a resilient locking washer having at least one locking hook, said locking washer attached to said knob core and engaged with said feed-through sleeve;

a stop element fixed relative to said front panel and disposed to engage said locking hook as said feed-through sleeve is rotated in at least one direction to cease rotation of said feed-through sleeve in said at least one direction; and said knob core disposed to displace said locking hook when said knob core is moved by pressing in said axial direction to prevent said locking hook from engaging said stop element so that said feed-through sleeve can be rotated past said stop element.

13. A knob assembly as claimed in claim 12 wherein said locking washer has a central hole having a diameter corresponding to an outer diameter of said knob core, and a slot extending from an outer edge of said locking washer to said hole, said slot having a width which is less than the diameter of said hole.

14. A knob assembly as claimed in claim 12 further comprising:

a manipulable element surrounding said knob core and said feed-through sleeve at a front side of said front panel;

a protection plate covering said front panel, said protection plate having an annular projection surrounding said opening in said front panel and extending outwardly toward said manipulable element and surrounding said feed-through sleeve;

said manipulable element consisting of deformable material and tightly enclosing said projection of said protection plate;

said manipulable element having a collar at an exterior thereof; and said stop element being disposed at a backside of said front panel.

15. A knob assembly rotatably mounted in a hole in a front panel of an apparatus, said front panel having a thin protection plate, said protection plate having an outwardly extending annular projection about the hole and said knob assembly comprising a rotatable manipulable element co-rotatable with said knob assembly and consisting of deformable material and being formed to tightly enclose said projection on said protection plate while permitting rotation of said manipulable element on said projection.

16. A knob assembly as claimed in claim 15 further comprising:

a feed-through sleeve extending through and rotatably mounted in an opening in said front panel;

a knob core disposed inside said feed-through sleeve and being axially movable therein;

resilient means acting on said knob core for normally urging said knob core in a first axial direction; and a locking washer means fastened to said knob core for locking said feed-through sleeve against a stop in at least one direction of rotation and for releasing said feed-through sleeve from engagement with said stop when said knob core is pressed against said resilient means in a second axial direction opposite said first axial direction;

said manipulable element surrounding said feed-through sleeve and said knob core and being co-movable therewith.

17. A knob assembly as claimed in claim 16 wherein said locking washer simultaneously forms said resilient means.

* * * * *